E. A. FLOYD.
Bee Hive.
No. 65,367.  Patented June 4, 1867.
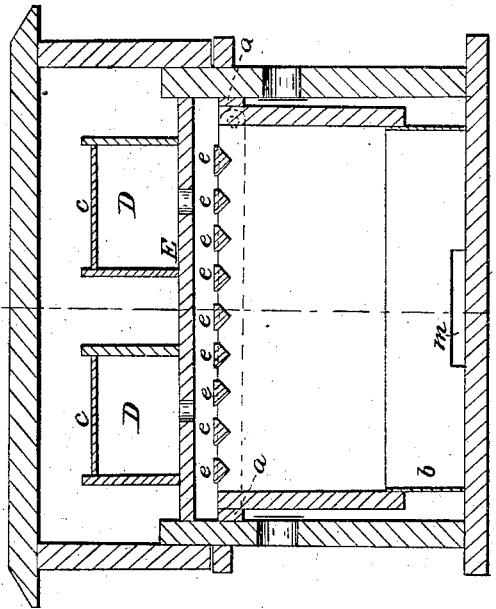
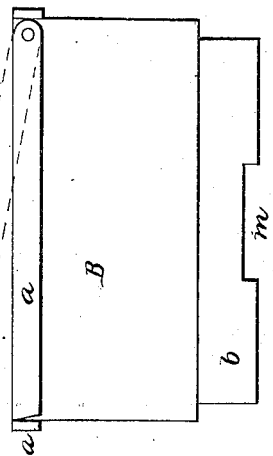
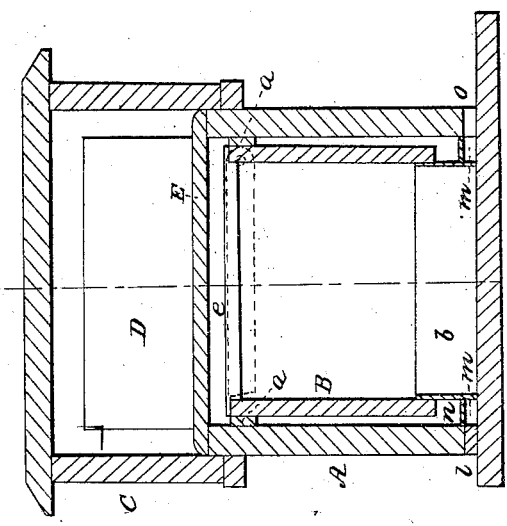
Witnesses:
P. T. Dodge
P. E. Wilson
Inventor:
E. A. Floyd
By M. E. Dodge
Attorney

United States Patent Office.

E. A. FLOYD, OF MACOMB, ILLINOIS.

Letters Patent No. 65,367, dated June 4, 1867.

IMPROVEMENT IN BEE-HIVES.

The Schedule referred to in these Letters Patent and making part of the same.

TO ALL WHOM IT MAY CONCERN:

Be it known that I, E. A. FLOYD, of Macomb, in the county of McDonough, and State of Illinois, have invented certain new and useful improvements in Bee-Hives; and I do hereby declare that the following is a clear, full, and exact description thereof, reference being had to the accompanying drawings, making part of this specification, and to the letters of reference marked thereon.

Figure 1 is a vertical section on the line $x\ x$ of fig. 2.

Figure 2 is a vertical section on the line $z\ z$ of fig. 1; and

Figure 3 is a side elevation of the inner box, removed from the hive.

My invention consists in constructing a hive with an inner box to contain the bees and honey, and having metal protection against the bee-moth, together with other novel details.

I construct the body of the hive, A, of a rectangular box, open at the top, and having a bottom attached, as shown in the drawings. Within this I fit a box, B, somewhat less in size, so as to leave a space between the inner and outer cases, all around, as shown in figs. 1 and 2. This inner box B is less in height than the outer box A, and has attached around its lower portion a metal plate, $b$, made of tin or other smooth metal, up which the moth or its larvæ cannot climb. This metal piece $b$ rests closely upon the bottom of the hive, all around, except at the centre on two sides, where an opening, $m$, is made for the bees to enter. A corresponding opening, $o$, is made in the case A, on one side, and a similar opening is made on the opposite side, extending the entire width of the case A, into which is fitted a block, $l$, and which can be removed at will, for ventilating or cleaning out the hive. A covered passage-way, $n$, extends from the opening at $l$ into the inner case B, so that moths entering the passage made by the removal of the block $l$ at any other point than this passage-way $n$, cannot enter the inner case, but must remain in the space between the inner and outer cases. The bees will protect the narrow passages $m$, so that moths cannot enter the inner case B, and hence, if they enter at all, they will be confined to the space between the cases; and if the larvæ are hatched in this space, they being unable to ascend the smooth surface of plate $b$, they will thus be prevented from entering case B at the top. Across the top of the box B extends a series of triangular bars $c$, to the under side of which the bees will attach their comb. Resting on the top of the outer case A are one or more boards, E, which have holes in them for the bees to pass up into the surplus-honey boxes D which rest thereon, and are covered by the upper box C, as shown in figs. 1 and 2. These boxes D have their upper surfaces composed of plates of glass, $e$, to enable their interior to be examined at pleasure without removing them. To the sides of the inner box B, at the top, is pivoted a bar, $a$, as shown clearly in fig. 3. This bar is of proper thickness to fill the space between the inner and outer cases, as shown in section in figs. 1 and 2. These bars being pivoted at one end, can be turned up, as indicated in red in fig. 3, so as to permit the clearing away of any webs or moths that may accumulate between the cases. The case or box B can be lifted entirely out of the hive with its contents whenever desired, for any purpose whatever. At the same time the two boxes thus arranged constitute a double wall, with an air-space between them to protect the bees from cold and moisture.

Having thus described my invention, what I claim, is—

1. A bee-hive, consisting of an outer case, A, resting close on a bottom-board, and an inner case, B, having its lower portion consisting of a strip of smooth metal, with its edge fitting tight on the bottom-board, with the covered passage-way $n$, leading from the outside to the inner case, as shown and described.

2. The pivoted bars $a$, arranged to operate in connection with the cases A and B, as described.

E. A. FLOYD.

Witnesses:
K. P. MORSE,
F. G. MORSE.